(12) United States Patent
Griswold

(10) Patent No.: US 7,976,384 B2
(45) Date of Patent: Jul. 12, 2011

(54) CONTACTLESS CARD READING IN A GAMING MACHINE

(75) Inventor: Chauncey W. Griswold, Reno, NV (US)

(73) Assignee: IGT, Reno, NV (US)

(*) Notice: Subject to any disclaimer, the term of this patent is extended or adjusted under 35 U.S.C. 154(b) by 1445 days.

(21) Appl. No.: 10/084,820

(22) Filed: Feb. 27, 2002

(65) Prior Publication Data

US 2003/0162593 A1 Aug. 28, 2003

(51) Int. Cl.
*A63F 9/24* (2006.01)
(52) U.S. Cl. ......................................... 463/29
(58) Field of Classification Search .......... 463/1, 16–21, 463/23, 25, 29, 39, 43, 47; 725/6; 235/380; 340/572.1; 382/100
See application file for complete search history.

(56) References Cited

U.S. PATENT DOCUMENTS

| | | | |
|---|---|---|---|
| 5,206,495 A * | 4/1993 | Kreft | 235/492 |
| 5,229,764 A | 7/1993 | Matchett et al. | |
| 5,429,361 A * | 7/1995 | Raven et al. | 463/25 |
| 5,586,936 A | 12/1996 | Bennett et al. | |
| 5,735,742 A * | 4/1998 | French | 463/25 |
| 5,736,727 A | 4/1998 | Nakata et al. | |
| 5,770,533 A | 6/1998 | Franchi | |
| 5,795,228 A | 8/1998 | Trumbull et al. | |
| 5,865,470 A | 2/1999 | Thompson | |
| 5,869,822 A | 2/1999 | Meadows, II et al. | |
| 5,879,453 A | 3/1999 | Streeter et al. | |
| 5,952,640 A | 9/1999 | Lucero | |
| 6,010,404 A | 1/2000 | Walker et al. | |
| 6,099,408 A | 8/2000 | Schneier et al. | |
| 6,110,041 A * | 8/2000 | Walker et al. | 463/20 |
| 6,135,887 A | 10/2000 | Pease et al. | |
| 6,149,062 A | 11/2000 | Danielson | |
| 6,150,921 A * | 11/2000 | Werb et al. | 340/10.1 |
| 6,157,966 A | 12/2000 | Montgomery et al. | |
| 6,161,762 A | 12/2000 | Bashan et al. | |
| 6,168,084 B1 | 1/2001 | Mish | |
| 6,168,521 B1 | 1/2001 | Luciano et al. | |

(Continued)

FOREIGN PATENT DOCUMENTS

CA 2177516 12/1996

(Continued)

OTHER PUBLICATIONS http://www.nxp.com/news/content/file_586.html, Leading-edge smart card technology meets smartest watch technology, Aug. 29, 2000, NXP, 1-4 pages.*

(Continued)

*Primary Examiner* — Corbett B Coburn
(74) *Attorney, Agent, or Firm* — Armstrong Teasdale LLP

(57) ABSTRACT

A gaming machine may be activated by an individual player for subsequent play by displaying to the gaming machine, without physical contact with the gaming machine, a card carried by the player. The card carries indicia which may include suitable electronic memory, to be sensed by apparatus associated with the gaming machine, to cause the wireless transfer of individualized data concerning the player from the card to the gaming machine or to a computer network that is associated with the gaming machine. The data is evaluated against a stored database, which database may include identification of the card holder. The data is then evaluated against the stored database, and the gaming machine is activated for subsequent play upon favorable evaluation of the data.

10 Claims, 1 Drawing Sheet

U.S. PATENT DOCUMENTS

| | | |
|---|---|---|
| 6,182,217 B1 | 1/2001 | Sedlak |
| 6,193,163 B1 | 2/2001 | Fehrman et al. |
| 6,202,932 B1 | 3/2001 | Rapeli |
| 6,213,403 B1 | 4/2001 | Bates, III |
| 6,264,560 B1 | 7/2001 | Goldberg et al. |
| 6,307,956 B1 | 10/2001 | Black |
| 6,325,294 B2 * | 12/2001 | Tuttle et al. .................. 235/492 |
| 6,327,376 B1 | 12/2001 | Harkin |
| 6,343,988 B1 * | 2/2002 | Walker et al. .................. 463/21 |
| 6,363,485 B1 | 3/2002 | Adams et al. |
| 6,511,376 B2 | 1/2003 | Walker et al. |
| 6,527,638 B1 | 3/2003 | Walker et al. |
| 6,612,928 B1 | 9/2003 | Bradford et al. |
| 6,636,620 B1 | 10/2003 | Hoshino |
| 6,851,607 B2 | 2/2005 | Orus et al. |
| 6,999,936 B2 | 2/2006 | Sehr |
| 2001/0011680 A1 | 8/2001 | Soltesz et al. |
| 2001/0049775 A1 * | 12/2001 | Rechberger et al. .......... 711/154 |
| 2002/0047044 A1 * | 4/2002 | Orus et al. .................. 235/380 |
| 2002/0082084 A1 | 6/2002 | Snow et al. |
| 2002/0167406 A1 * | 11/2002 | Garber et al. ............. 340/572.7 |
| 2002/0174336 A1 * | 11/2002 | Sakakibara et al. .......... 713/172 |
| 2003/0067389 A1 * | 4/2003 | Look .......................... 340/572.1 |
| 2003/0159040 A1 | 8/2003 | Hashimoto et al. |

FOREIGN PATENT DOCUMENTS

| | | |
|---|---|---|
| DE | 41 09 114 A1 | 9/1992 |
| DE | 19944140 | 3/2001 |
| DE | 19952691 | 5/2001 |
| DE | 19952692 | 5/2001 |
| DE | 19954821 | 5/2001 |
| EP | 0981808 B1 | 3/2000 |
| EP | 1120757 | 8/2001 |
| FR | 2760331 | 9/1998 |
| GB | 2363658 B | 1/2002 |
| JP | 2001236473 | 8/2001 |
| JP | 2001300130 | 10/2001 |
| JP | 2001331750 | 11/2001 |
| WO | WO 9410658 | 5/1994 |
| WO | WO 9416416 | 7/1994 |
| WO | WO 99/00164 | 1/1999 |
| WO | WO 01/71516 A1 | 9/2001 |
| WO | WO 01/82176 A1 | 11/2001 |

OTHER PUBLICATIONS

Wikipedia Article, Biometrics.*
"Leading-edge smart card technology meets smartest watch technology"; Business News from Philips Semiconductors, E/BN-1148/60, Aug. 29, 2000.
U.S. Appl. No. 10/759,712, Griswold et al.
U.S. Appl. No. 09/491,899, Wells et al.
Supplementary European Search Report, dated Jul. 11, 2008, 3 pages.
Wolfgang Rankl: "Handbuch der Chipkarten", 1999, Verlag Hanser, Germany, XP-002487904; pp. 11-12; pp. 37-38; pp. 51-55; pp. 112-125.

* cited by examiner

CONTACTLESS CARD READING IN A GAMING MACHINE

BACKGROUND OF THE INVENTION

Cashless gaming machines offer many advantages, and are accordingly attractive to both casinos and players. The term "casino" as used herein relates not only to conventional, large casinos, but to any business establishment where one or more gaming machines are present for commercial playing.

As taught for example in Franchi U.S. Pat. No. 5,770,533, a casino operating system may provide cashless gaming in which the respective player positions are equipped with a control panel including a card reader into which a credit card is inserted. However, there is a historical problem associated with inserting cards into gaming machines. Frequently, the players forget their cards and leave them behind in the gaming machine card readers.

DESCRIPTION OF THE INVENTION

By this invention, gaming machines are provided with contactless card readers in which cards are not inserted into a receptacle for reading. Thus, the card never leaves the possession of the user, and the problem of loss, as well as other significant problems, are solved.

For example, the card readers may be embedded into the slot machines, and the player merely needs to move the card in front of the machine without any contact. Thus, the card reader can be protected from damage, as well as from direct access by cheats or thieves. Also, the card will not be damaged by the machine as sometimes is the case in the "card eating" problem of conventional machines, having a recess that receives the card for direct contact reading.

More specifically, the invention relates to a method of activating a gaming machine by an individual player for subsequent play. The method comprises the steps of: displaying to said gaming machine, without physical contact with the gaming machine, a card (or other device) carried by the player. The card or other device may comprise suitable apparatus to permit the wireless transfer of individualized data concerning the player from the card to the gaming machine, or to a computer network that is associated with the gaming machine, and such data is so transferred. The card may comprise suitable electronics and an antenna to send and receive radio or microwave signals. Alternatively, the card or other device may carry optical indicia which may be sensed by an optical sensor, for example, a bar code system or the like. The term "card" is intended to include other personally carried devices having equivalent function, such as a bracelet, a necklace, a rod, a disc, or a small box.

Furthermore, a "card" in accordance with this invention can be carried as an integral part of personal clothing, for example, on the sleeve of a shirt or jacket and integrally attached thereto, on a hat as an integral part thereof, as a belt or belt buckle, or the like. Thus, a given casino can provide favored players with a special card-carrying hat, jacket, or belt buckle, which permits the automatic actuation of gaming machines without the need for the user to present any other card to a given gaming machine.

Then, by this method, one provides a step of evaluating the transferred, individualized data against a stored database. For example, this data may include an identification of the user, and it may contain a balance of cash, either representing an actual cash deposit which may be transferred to or through the gaming machine as play takes place, and cash which may be received as prizes from the gaming machine and transferred back to the card as a cash entry. Alternatively, it may comprise an upper credit limit for the card and the player and a current balance. Other data as well may be provided as desired.

The gaming machine is then activated upon favorable evaluation of the data against the database, for the subsequent play of the gaming machine by the player.

It may be also desirable for the player to physically actuate the gaming machine as a separate, added step in order to activate the machine. This might done by the simple pressing of a button. Thus, if the player just walks by the machine, perhaps having the card in his hand, or pocket, the machine will not read the card and activate the machine, in the absence of the physical pressing of a button by which the player indicates his desire to activate the machine.

As another possibility, it may be necessary to activate the machine for the player by moving the card in closely spaced relation to a sensor on the gaming machine, to display the card to the gaming machine without physical contact. This system can also serve to generally avoid accidental activation of the machine, since a rather deliberate act by the part of the player is required.

It may also be desirable to require the player to provide a separate, personal identification to the gaming machine in the form of letters or numbers (such as a PIN number), as a necessary requisite to the machine activation. The advantages of having a personal PIN number are well known, relating largely to protection against use by unauthorized third parties if the card is lost or stolen.

Alternatively, a separate, personal identification of the player can be accomplished by a technique of biometrics, such techniques being known to the art; for example, fingerprint identification, computerized facial recognition, ear or eye pattern recognition, voice recognition, or the like, so that the player does not have to enter a pin number, but can be automatically recognized by such a technique.

Techniques of this type are described in U.S. patent application Ser. No. 09/491,899, assigned to the assignee of this application. Preferably the biometric information for the pin number may be carried on the card, to be compared with the pin number provided by the user or the biometric data obtained from scanning the would-be user, making use of a sensing and comparison system carried in the gaming machine, or received by the gaming machine and sent to a central computer where proper comparison can be made to authenticate the identity of the would-be player.

Any one of the above possibilities may be used separately or together in any combination, in accordance with this invention.

As another option, after evaluation of the individualized data, the gaming machine may be activated in a specific mode selected from a plurality of possible modes of activation, the specific modes selected being a function of the individualized data. For example, the player may be personally registered in the database, with various facts and characteristics of his playing and other preferences being of record. This may be processed in accordance with a paradigm entered into the machine programming, to present to the player personalized options relative to a particular choice of games to be played, without the player having to go through a normal pattern of selection for a desired game. This may be based on the player's previous habits. Also, the specific mode selected from the plurality of possible modes of activation may include one or more special offers of a benefit or activity for the player: special purchase options, special activities either offered free or for a reduced price, depending upon the past history of the player. Particularly, favored customers may receive a highly individualized treatment from each of the gaming machines that they frequent through the use of the contact-free cards and the method of this invention.

One desirable option for the invention is to provide to a "smart" card used in this invention the capability of personally saving the game that the player is involved in. For example, a progressive game may be saved with the player then being able to temporarily put a hold on the play, and come back later to enter into the game at the very same spot and to finish it. Similarly, with respect to an electronic bingo game, such a game would be desirably saveable by insertion by the player of proper instructions into the key pad. Such saving of such games might take place by either entry into the memory of the computer database, or by special instructions transmitted to the smart card, which would then be retransmitted when game play began again at any appropriate gaming machine.

The respective cards may be of the "smart" variety or otherwise, and may carry variable data resulting from electronic or other interactions with a sensor associated with the gaming machine. For example, a running balance of funds or credit available for playing may be carried on the card, changing as two-way interaction takes place between the card and one or more sensors associated with gaming machines. Alternatively, the sensor itself may be in the vicinity of the gaming machine, but may be separate and not associated with a particular gaming machine, to provide similar activities with the advantages described above. The cards may also carry and manage separate accounts for the player, such as an account for video poker activities, and a separate account for his activities with other games.

Cards with bar codes or other optical systems may be used in a noncontact way for many of the above results and advantages.

Various perks, benefits, or complimentary items such as free dinners or discounted show tickets may be offered to the player on the screen of a gaming machine, depending on who the player is resulting from the information that is on the card used in this invention.

Electronic cards used in this invention may utilize the Philips' MIFARE® interface technology, if desired.

DESCRIPTION OF SPECIFIC EMBODIMENT

Figure 1:
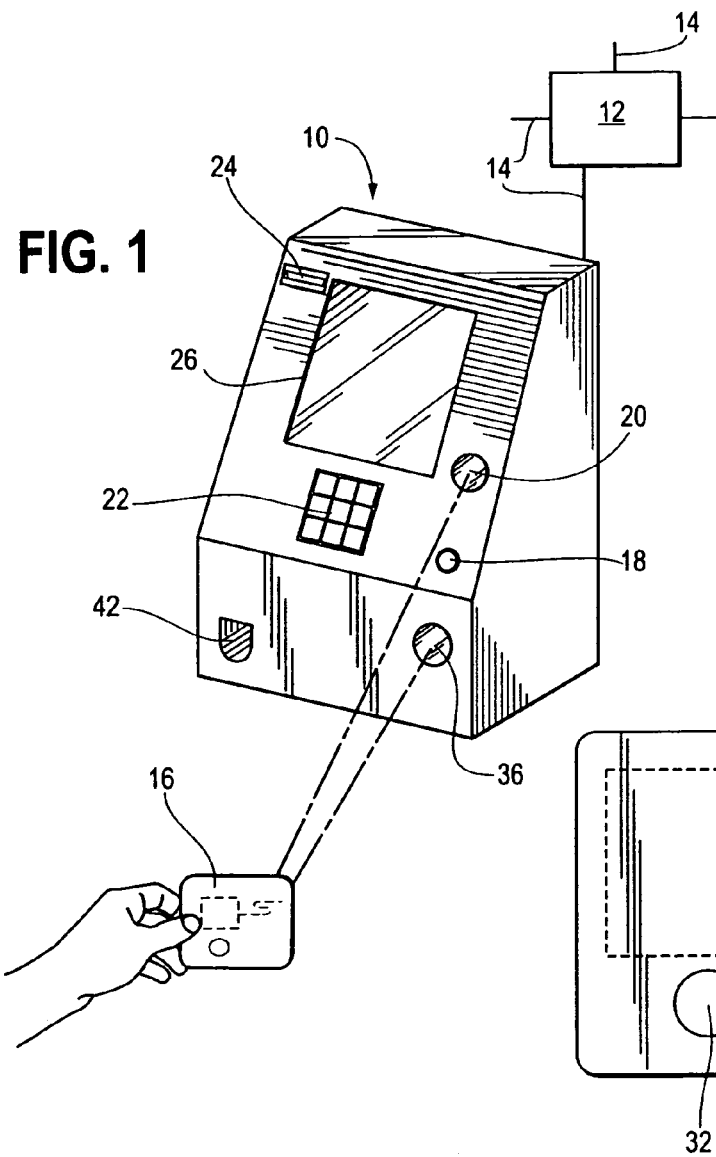
FIG. 1 is a perspective view of a gaming machine and the hand of a player having a card in the process of activating the gaming machine.

Referring to the drawings, a gaming machine 10 is shown, which may be any kind of gaming machine, for example a spinning reel machine or an electronic video gaming machine which plays different kinds of games. The machine may be linked into a network connecting with a central computer 12, or it may be of the stand alone type. The network operated by computer 12 may include a number of connection circuits 14 which communicate with gaming machine 10 and other similar gaming machines.

In accordance with this invention, a player and guest of the casino has typically registered or received his or her card 16 for play among the many gaming machines of the casino. When the player wishes to play a particular game 10, the person displays card 16 to the gaming machine and, typically, also pushes actuator button 18 to instruct machine 10 to read card 16 and activate the machine. The advantage of this is particularly found in the nonoptical systems where a card communicates with the machine by a radio frequency (RF) signal. If machine 10 were always active to sense an RF signal, the machine might be activated when the customer walks by with the card in his or her pocket.

Also, as stated above, card 16 could be in the form of a special necklace, wristwatch or other bracelet, clothing article, or the like, so that the simple pushing of button 18 will activate the machine as reader 20 senses the card and the indicia thereon.

Also, it is typically desirable for the player to have at least the option to enter a PIN number at keyboard 22, for purposes of security in the event that card 16 is lost. Alternatively, a biometric system may be used, as referred to above, such as a facial scan, causing the computer to recognize the player.

Gaming machine 10 also may have a bill/coin collector 24 for use by cash customers. Screen 26 displays the desired game.

Figure 2:
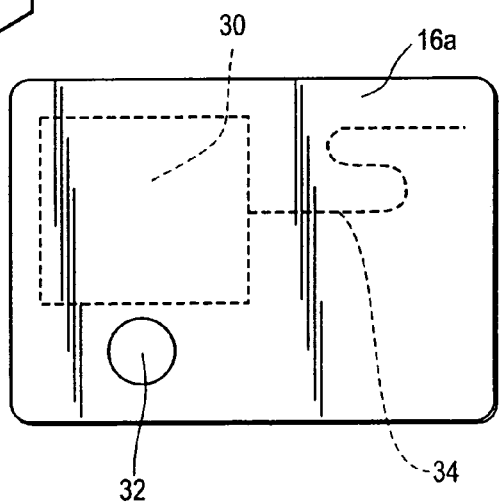
FIG. 2 is a plan view of an electronic "smart" card that might be used in accordance with this invention.

Referring to FIG. 2, an electronic "smart" card 16a is shown in which card 16a carries an electronic memory and logic chip 30, powered by replaceable small, flat battery 32, with the card also carrying electronic antenna 34. Alternatively, the card electronics may operate by an induced current without a battery.

When such a card 16a is presented to an appropriate gaming machine 10, it may be conventionally read by card reader 20 in gaming machine 10. Card 16a may be activated by a signal module 36 in machine 10 which activates card 16 to transmit its identification signal to reader 20 via antenna 34 as a radio frequency or microwave signal, typically upon pressing of button 18. This activates the machine to be ready to receive the PIN number on key pad 22 if it is desired for a PIN number to be used or a biometric authentication can be used. Upon authentication of card 16a the machine may be ready for play. Alternatively, the function of button 18 may be carried by key pad 22 so a simple pressing of any key pad button 22, will actuate the machine to signal card 16a through transmitter 36 and to receive the authenticating signal from card 16a by sensor 20. Other known systems for utilization of an electronic card may also be used in this circumstance, for noncontact validation and authentication of a player at a gaming station.

Smart card 16a can carry a credit record on behalf of the player, or even may carry electronic cash which has been placed there as an actual cash entry to be honored by banks, by the two way communication that is possible between card 16a and gaming machine 10. The credit or cash balance may rise or fall as play continues, depending upon the amount of play by the player and the rewards that he or she may win. Thus, the player may have a continuously updated cash or credit balance in his smart card 16a. If he leaves one machine and goes to another, the new machine, upon communication with card 16a, will know the cash balance and will be able to act appropriately by providing the player with machine action as long as the player's cash or credit balance is appropriate. Then, at the end of the day, the player can cash out his card, if appropriate, at a central cashier or automated kiosk. The player can also read the card at any time at a gaming machine or kiosk, to see the current cash or credit balance.

Figure 3:
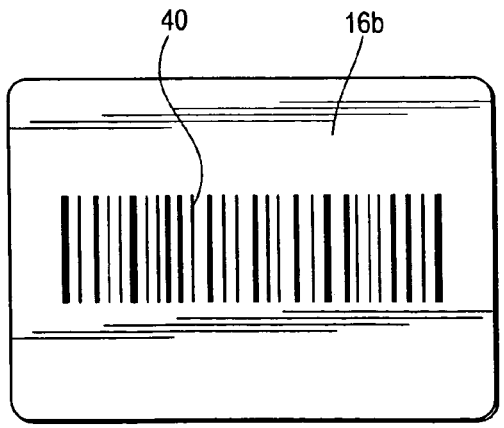
FIG. 3 is a plan view of an optical card that might be used in this invention, which card carries a bar code.

Turning to FIG. 3, this card carries a bar code which identifies the player, and also may carry other indicia relating to the player. Such a card 16b may be presented to an optical card reader, which could comprise reference numeral 20 in that circumstance, conveying the identification data of the card holder to gaming machine 10, typically after activation by button 18 or alternatively activation by key pad 22. Then, the player would typically punch in his PIN number for complete activation of the machine, or this authentication might be accomplished by a biometric technique as described above. In this circumstance, further data concerning the player such as his cash or credit balance might be stored in the central computer 12, with the cash or credit balance interactions going back and forth between gaming machine 10 and central computer 12. Periodically, the user's cash balance could be displayed on screen 26, or any time on request of the player by the use of key pad 22. Similarly, winnings from gaming machine 10 might be provided through cash trough 42, or might be transmitted to the patient's account in central computer 12, the status of which would be accessible by the player at any time through key pad 22. Typically, card 16b would be swept in front of optical sensors 20 in the manner of a conventional bar code reader.

Here also, the player can move with his optical card 16b from machine to machine, being identified by the card and PIN number through the action of the communication of each machine 10 with central computer 12 or, if machine 10 is unconnected, by memory stored in that individual machine by a connected microprocessor system.

Since the player is identified by the electronic system 10, 12 with either card 16a or 16b, the database concerning this player may have special, personalized characteristics of interaction with the player, in a manner depending upon the program of the casino operation. For example, certain players may be invited to a free dinner at an appropriate time if they meet desired criteria as set up in central computer 12. The same may go for free or discount tickets to a show that is playing. Personalized statements, messages, encouragements, offers, suggestions and the like may be displayed to the player no matter what machine he is playing, as he or she travels around the casino. When the player steps up to a certain specific machine 10 and actuates it with the card, the database in the machine or in central computer 12 may recognize the person as having certain favorite games. It can greet him by name and ask if he or she wishes to play one of his or her favorites. Such a personalized atmosphere can envelop the player as he or she moves around the casino, being personally greeted by every machine that he or she actuates in the manner of a valet or doorman who knows you well. This adds significantly to the enjoyment and comfort of the experience by the players. If the player is wearing a bracelet, belt, hat, or necklace card, for example, the experience can be similar to not having a card at all, with the machine automatically reading the bracelet, belt, hat, or necklace, as the user reaches toward the machine, for example, to activate it.

Figure 4:
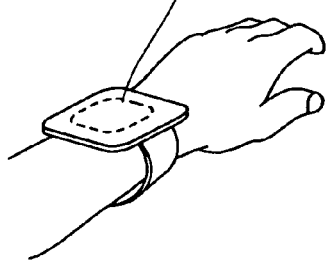
FIG. 4 shows a player's arm carrying an electronic wristwatch which also functions as a smart card for purposes of this invention.

Referring to FIG. 4, the "card carried by the player" may in accordance with this invention comprise a wristwatch 16c carried by the player, in which the wristwatch is typically electronic and carries the necessary smart card electronic components (of the type illustrated in FIG. 2) built into the wristwatch so that a decorative, fashionable wristwatch may carry the smart card technology capable of being used as described herein, without any need to withdraw a card from the wallet or the like. In this and other embodiments, gaming machines can automatically greet the holders of cards 16a, 16b, or 16c, even before the machine has been activated if desired, although generally, to play a machine, the card holder will activate it either through pressing a button 18 or 22 and/or entering of a pin number into key pad 22 or by biometric scan. Similar smart card electronic components may be placed in a necklace, a lapel pin, a decorative bracelet that is not a wristwatch, a belt, a hat, or other articles of personal adornment.

The above has been offered for illustrative purposes only, and is not intended to limit the scope of the invention of this application, which is as defined in the claims below.

That which is claimed is:

1. The method of activating a gaming machine by an individual player for subsequent play, which comprises:
    receiving a manual actuation from the individual player by said gaming machine to enable said gaming machine to accept noncontact electronic data transmission from a card carried by the player;
    receiving a display of the card from the player by the gaming machine, without physical contact between said gaming machine and said card;
    said card comprising suitable electronics for data transmission;
    causing wireless transfer of first individualized data concerning the player from the card to the gaming machine or to a computer network that is associated with said gaming machine;
    evaluating said data against a stored database;
    upon favorable evaluation of said data, said gaming machine providing a personalized greeting to the player;
    receiving biometric sensing as separate, personal identification to the gaming machine;
    evaluating said biometric sensing;
    activating said gaming machine for said subsequent play upon favorable evaluation of said data and said sensing;
    during or after said subsequent play, causing wireless transfer of second, individualized data back to the card to be stored.

2. The method of claim 1 in which, after evaluation of said data, the gaming machine is activated in a specific mode selected from a plurality of possible modes of activation, the specific mode selected being a function of the individualized data.

3. The method of claim 2 in which the specific mode selected comprises a particular game or choice of games to be played.

4. The method of claim 2 in which the specific mode selected comprises a special offer of a benefit or activity for the player.

5. The method of claim 1 in which said individualized data are transferred by a radio or microwave frequency signal from the card to the gaming machine or said computer network.

6. The method of claim 1 in which the card includes readable indicia and said indicia are electronic indicia stored in a memory of a microprocessor carried in the card.

7. The method of claim 1 in which the card is carried by the player in the form of an article of personal adornment or clothing.

8. The method of claim 7 in which the card is carried by the player in the form of a wristwatch.

9. The method of claim 1 in which said card carries a microprocessor, said microprocessor providing a plurality of separate accounts to the user.

10. The method of claim 1 in which said gaming machine is configured to receive a manual depression of a button for actuation of said gaming machine.

* * * * *